Dec. 20, 1955  R. B. BAGBY  2,727,657
ROTARY CONVEYOR TRAP CHAMBER FOR A FILLING MACHINE
Filed March 22, 1951  4 Sheets-Sheet 1
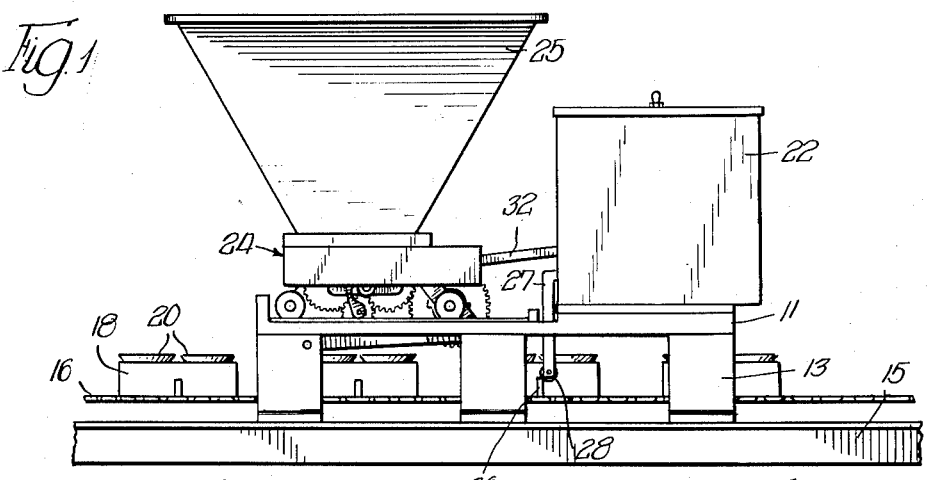
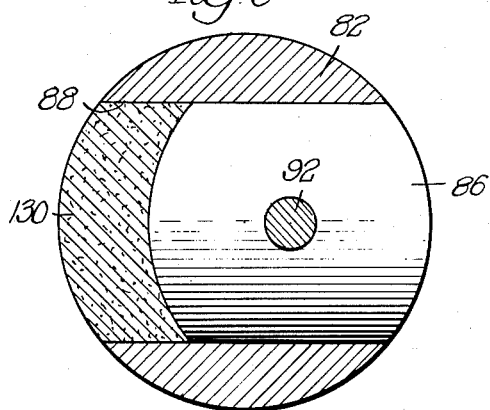
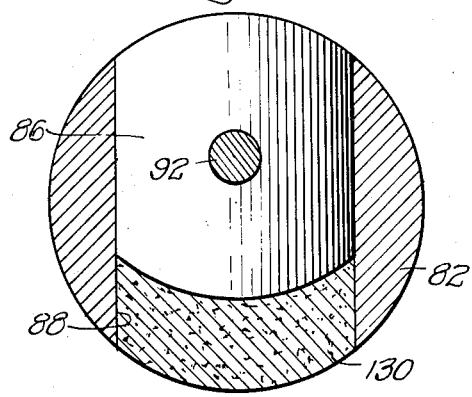
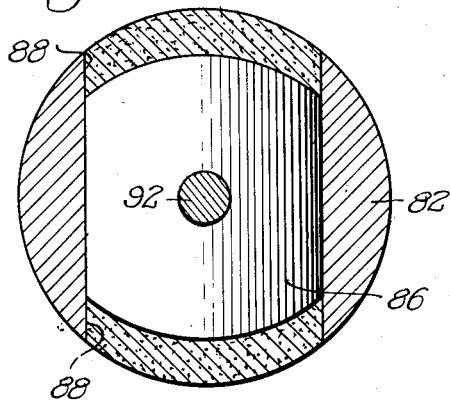
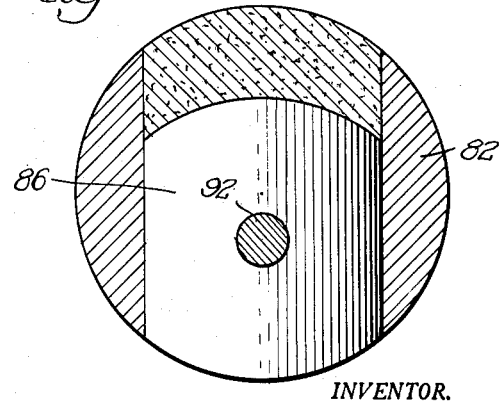
INVENTOR.
Ralph B. Bagby,
BY

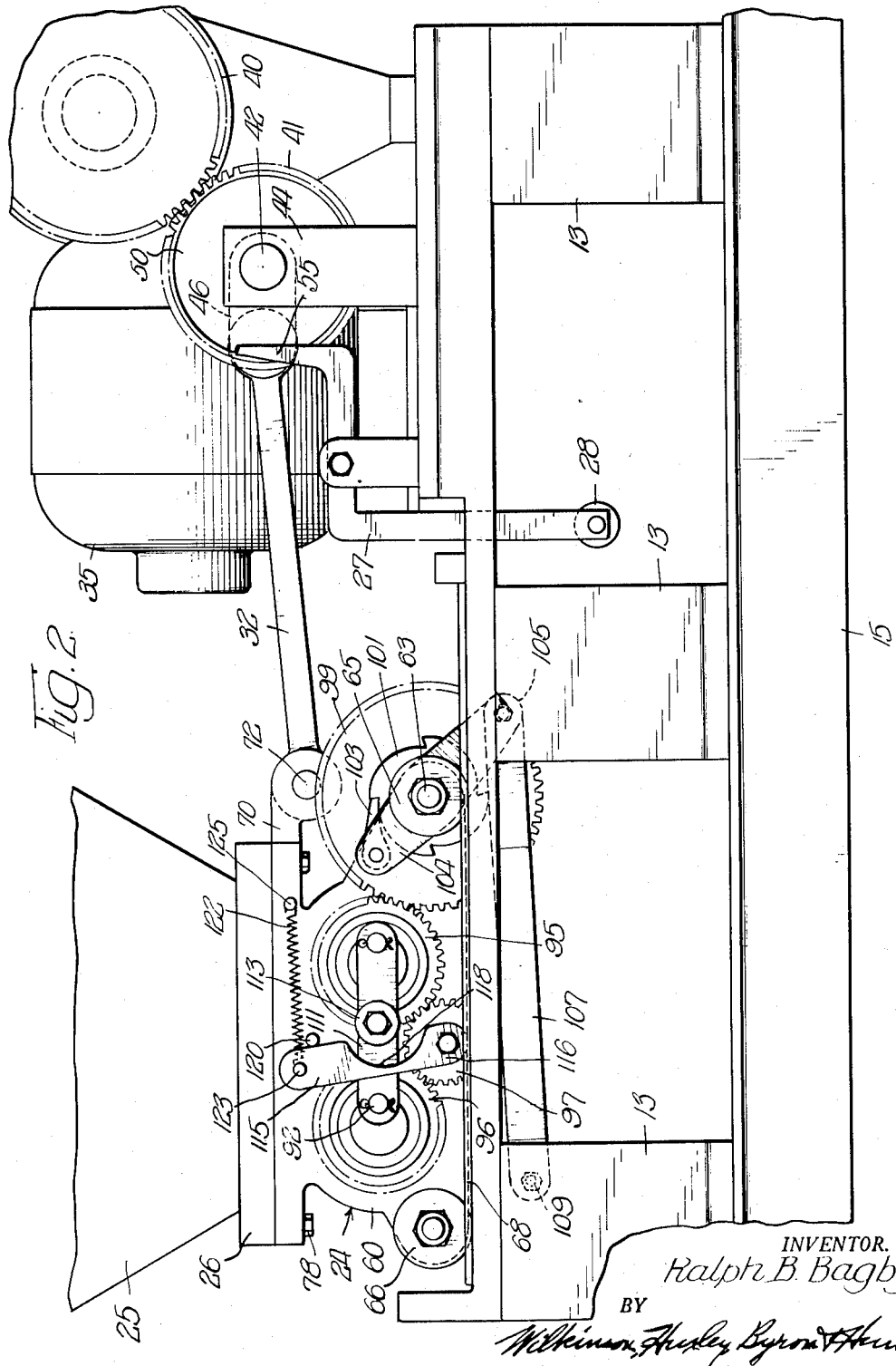

Dec. 20, 1955  R. B. BAGBY  2,727,657
ROTARY CONVEYOR TRAP CHAMBER FOR A FILLING MACHINE
Filed March 22, 1951  4 Sheets-Sheet 3
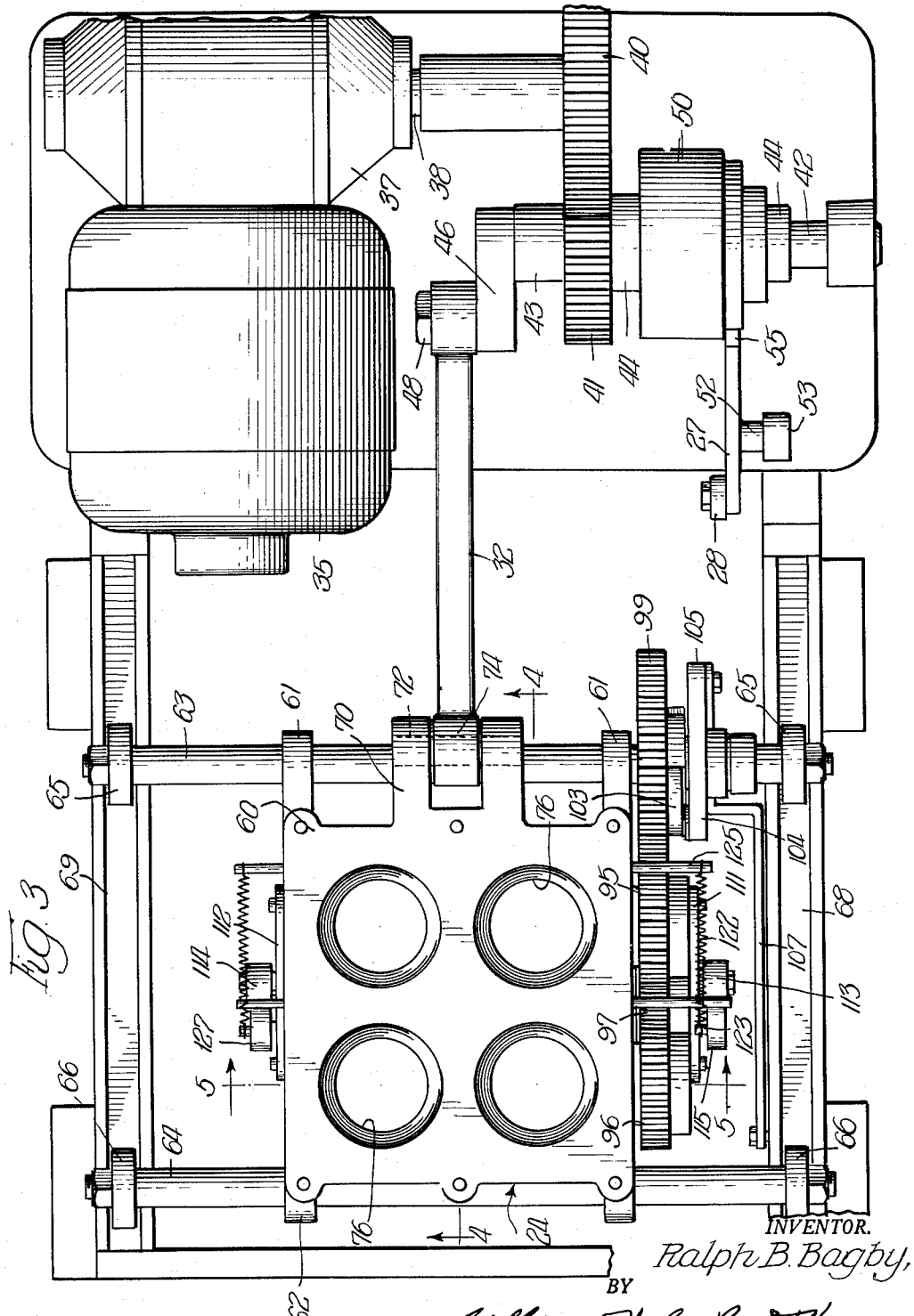

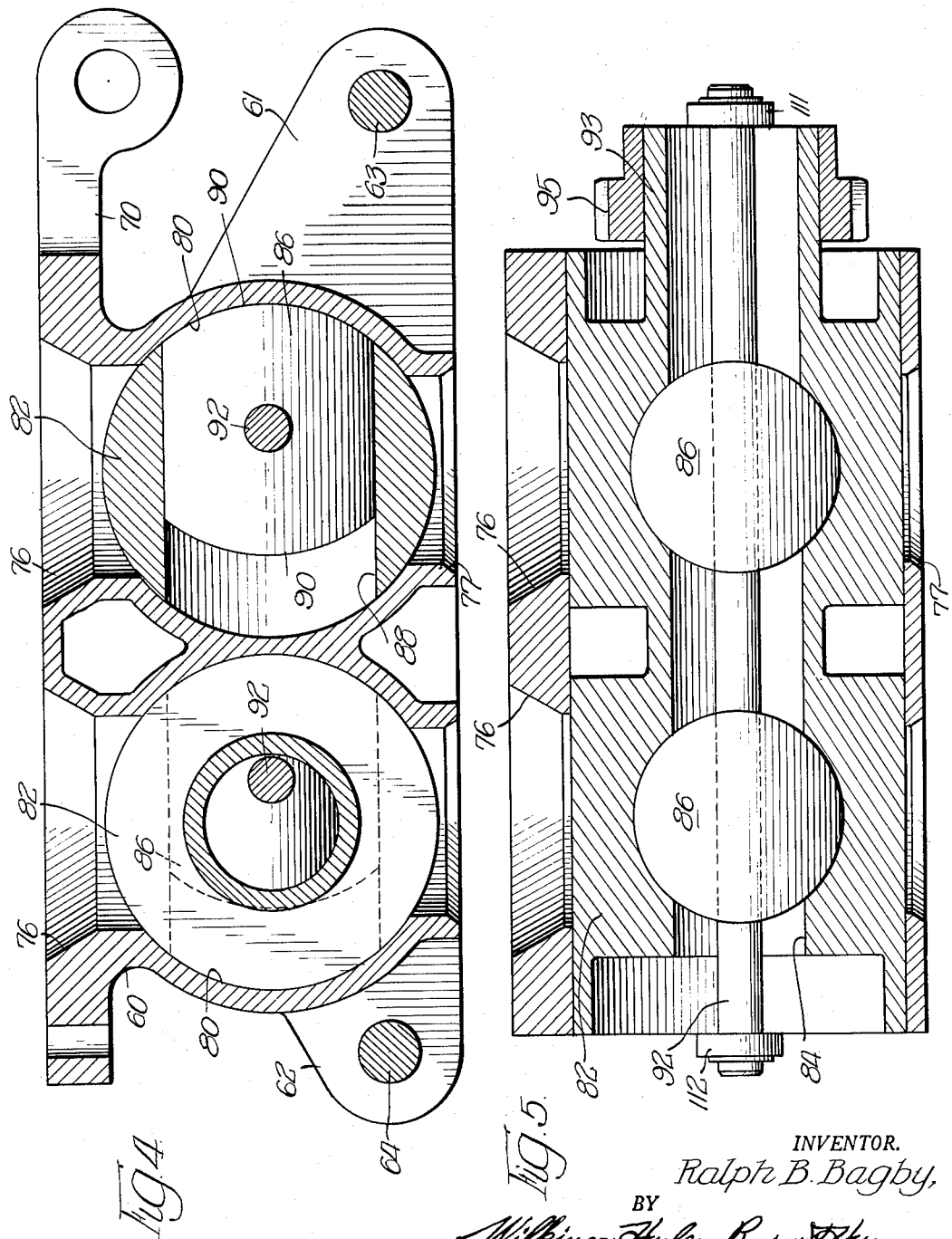

United States Patent Office 2,727,657
Patented Dec. 20, 1955

2,727,657

ROTARY CONVEYOR TRAP CHAMBER FOR A FILLING MACHINE

Ralph B. Bagby, Evanston, Ill., assignor, by mesne assignments, to Triangle Package Machinery Company, Chicago, Ill., a corporation of Illinois Application March 22, 1951, Serial No. 216,962

2 Claims. (Cl. 222—368)

The present invention relates to a new and improved filling machine and more particularly to a machine for filling pies, or the like.

A usual production method of making pies is to have the pie tins travel along a straight line conveyor. As the tins move along, the dough for the bottom crust is laid on the tins and shaped to fit the inner contour of the pie tin. As the pie tins, with the bottom crust therein, move along the conveyor, a measured amount of pie mix, such as fruit or other filling, is ladled into each tin. After the tin is filled the top crust is laid on and its edges trimmed and crimped. The completed pie then goes on to the ovens for baking.

According to general practice at present, the pie mix is ladled by hand into the bottom crust in the tins as they pass along the conveyor. This is a difficult job for manual operation and often results in somewhat sloppy and uneven distribution of the mix. It will be understood that many types of pie mix, comprising cherries in syrup or blueberries in syrup, or the like is used and the mix is somewhat like very runny preserves. The operator has to ladle this into the tin while the tin is in continuous motion along the conveyor. The operator must dip the ladle into a tub of the mix, wipe off part of the dripping excess and turn the ladle upside down while swinging it with the moving tin. The manual measurements are not completely uniform and there is some spillage and wastage of the mix. This spillage sometimes spoils the seal at the crimped edge of the upper and lower crust and results in an unsatisfactory product. After a day's run, the conveyor is coated with a mass of spilled mix and many of the dough trimmings are spoiled for reuse because of the fruit drippings.

One operator can keep up manually with ladling the fruit mix into single large pies, but it is now common to make four small pies in a single unitary pan carried on each section of the conveyor. This requires two operators and is a much more difficult operation for each operator than filling a single large pie on each section of the conveyor. A recent development is that of even smaller pies, six of which are baked in a unitary pan assembly on each section of the conveyor. The filling of six such pie tins on each section of a moving conveyor has been found to be beyond the capacity of hand operation.

The new pie filler of the present invention eliminates all hand ladling of the pie mix by the use of the construction shown and described herein. It is possible to fill four or six pies at a time on each conveyor unit efficiently and uniformly and without wastage. The present apparatus will put an accurately measured amount of mix into each pie without any hand operation. The pie filler of the present invention is designed to fit over the standard types of conveyors and to be supported on the frame of the conveyor. The filler is motor driven with the drive connected for automatic operation and filling action as each pie pan passes under the filler. The filler is also constructed to reciprocate above the conveyors and to carry out its filling operation while in motion in the same direction as the movement of the conveyor. This results in accurate filling without spillage over the edges of the pans however small. The filling openings in the filler are so located as to conform to the location and size of the individual pie receptacles on the conveyor.

It is an object of the present invention to provide a new and improved filler for pies or the like.

It is a further object to provide a filler of this type which may be associated with the usual types of conveyors used in pie making and baking.

It is also an object to provide a filler which is synchronized in operation with the conveyor movement and moves in the same direction during the filling operation.

It is another object to provide a filler which delivers an accurately measured amount of filling material.

It is an additional object to provide a filler structure which may be readily adapted to filling single or multiple pies or the like at each filling operation.

It is a further object to provide a filling machine which gives positive and controlled delivery of the filler material independently of the amount of material in the feed hopper.

Other and further objects will appear as the description proceeds.

I have shown certain preferred embodiments of my invention in the accompanying drawings in which:

Figure 1 is a side elevation of the pie filling apparatus;

Figure 2 is a side elevation, on an enlarged scale, with parts broken away and with the cover removed from the drive mechanism to show the construction;

Figure 3 is a plan view of the apparatus shown in Figure 2;

Figure 4 is a fragmentary longitudinal section taken on line 4—4 of Figure 3;

Figure 5 is a fragmentary transverse section taken on line 5—5 of Figure 3 and

Figures 6, 7, 8 and 9 are fragmentary sections on an enlarged scale showing the functioning of the measuring and filling valves.

Referring first to Figure 1, the apparatus comprises a supporting frame 11 which itself is supported on the legs 13 which rest upon the side frame 15 of a conveyor. This conveyor has connected movable conveyor sections 16 each of which carries a pie plate support 18 upon which pie plates 20 are shown. Upon the support frame 11 are mounted the drive mechanism which is enclosed in housing 22 and the feed mechanism indicated generally as 24. This mechanism 24 is fed from the hopper 25 which is adapted to hold material to be placed in the pie crust in the pans. The drive mechanism 22 is provided with a clutch trip arm 27 having a roller on its lower end, this roller being adapted to engage trip studs 30, one of which is carried on each conveyor section 16. The drive mechanism housed in the housing 22 is connected to the feed mechanism by means of the pitman 32.

Referring next to Figures 2 and 3, the drive mechanism comprises an electric motor 35 connected to a right angle reduction gear 37 and by shaft 38 to a drive pinion 40. This drive pinion 40 meshes with a driven pinion 41 carried on a tubular shaft fitted concentrically on an inner shaft 42 supported in bearings 43 and 44. One end of this inner shaft carries the crank arm 46 which has a pin passing through the end of the pitman 32, the pitman being secured in place by means of nut 48. The tubular shaft enters the clutch 50 which clutch is actuated by means of the previously described trip arm 27 having a lower roller 28 to engage the trip studs 30. This arm 27 is pivoted at 52 on support 53. Its upwardly extending end 55 normally holds the clutch 50 out of operation. This clutch 50 is of a standard spring pressed type which when released by end 55 connects tubular shaft to the shaft carrying the crank arm 46. This connection continues for a single revolution until arm end 55 again disconnects the clutch. Consequently, each time the roller 28 is tripped by trip lug 30, the crank arm 46 will move a single complete revolution. It will be understood that the motor 35 and drive 37 will be continuously operating.

The feed mechanism 24 comprises a lower frame 60 having ears 61 and 62 which carry axles 63 and 64, the axles in turn being carried on the rollers 65 and 66, respectively. These rollers roll within U-shaped track members 68 and 69. The frame member 60 is provided with the arms 70 carrying a pin 72 to which the end 74 of the pitman 32 is pivotally connected. In the form of construction shown, the filler dispensing mechanism is designed to dispense four small pies at a single time. Consequently, the member 60 is provided with four circular openings 76, shown in Figure 3. The hopper 25 has a base 26 which is secured to the upper face of frame member 60 by bolts 78, as shown in Figure 2.

The filling mechanism is shown in an enlarged scale in Figures 4 and 5. As seen in Figure 4, this member 60 has a pair of parallel spaced cylindrical passages 80 extending crosswise thereof and in such passages are closely fitted the cylindrical valve plugs 82. Each such valve plug has axially thereof a cylindrical bore 84, as shown in transverse section in Figure 5. The movable valve pistons 86 are fitted in transverse cylindrical openings 88 formed in each member 82. The valve pistons 86, consequently, have a cylindrical cross section to fit in the cylindrical openings 88 and have their faces 90 curved cylindrically and adapted to fit closely against the walls of the cylindrical passages 80.

Piston cross rods 92 extend through the cylindrical bore 84 in member 82 and are free to move therein. Each rod 92 extends through two members 86 and causes these two members to move in unison. As shown in Figure 5, the cylindrical valve plug 82 has a reduced cylindrical extension 93 which extends outwardly to one side of the housing member 60 and carries a gear 95. As shown in Figures 2 and 3, this gear 95 and a similar gear 96 carried by the other valve plug 82 are connected by gear 97 which meshes with both of said gears and therefore causes them to rotate in the same direction. The axle 63 carries the large drive gear 99 which gear meshes with the right gear 95, as shown in Figure 2. Directly connected to the gear 99 is the four toothed ratchet 101 which is actuated by pawl 103 pivotally connected to the arm 104. This arm 104 is pivoted on the axle shaft 63 and has its lower end 105 connected to link 107, the opposite end of which is pivotally connected at 109 to one of the supporting legs 13, as shown in Figure 2.

The two rods 92 have their adjacent ends on each side of the feed mechanism connected by links, the link 111 appearing at the right of Figure 5 and the link 112 at the left of that figure. As shown in Figure 2, a roller 113 is provided centrally of link 111 and as shown in Figure 3, a similar roller 114 is provided on link 112. A brake member 115, best shown in Figure 2, is pivoted at 116 on the shaft supporting the intermediate gear 97. The brake member extends upwardly outside of the connecting link 111 and has an arcuate surface 118 adapted to engage the roller 113 throughout a certain arc of movement of that roller as the link 111 moves in the operation of the apparatus. The movement of the upper end of brake member 115 is limited by stud 120, the upper end of the brake being urged against the stud by the spring 122. One end of the spring is connected to the stud 123 carried by the member 115 and the other end of which is connected to stud 125 which is secured to the body member 60. As shown in Figure 3 the opposite side of the frame 60 is provided with similar brake mechanism shown at 127.

In the operation of the machine it will be understood that the filler is located above the conveyor, as clearly shown in Figure 1. The conveyor is moved by suitable power means and drive sprockets which are not shown as they form no part of the present invention. In the construction, as shown, the conveyor moves from left to right and the filling operation takes place as the filling mechanism and the superposed hopper 25 are moved to the right by the pitman 32. As previously stated, the motor 35 is put in operation and drives the gear 40 and meshing gear 41 continuously through the reduction gear 37 and shaft 38. By means of its tubular shaft 44 the gear 41 continuously drives the driven portion of the clutch 50. As the roller 28 on the lower end of the drive lever 27 is moved to the right, as seen in Figures 1 and 2, the upper end 55 of trip lever 27 puts the clutch 50 in operation to cause a single rotation of the inner shaft 42 and of the crank arm 46. This causes the crank arm to move in the clockwise direction, as seen in Figure 2, through a complete revolution. This, by means of the pitman 32, draws the filler carriage 24 to the right, an amount equal to twice the throw of the crank arm 46 and the movement stops with the parts restored to the position shown in Figure 2.

As the carriage 24 moves to the right, it will be apparent that because of the connecting link 107, the lower end of the ratchet arm 104 cannot move with the carriage. This causes the arm 104 to pivot about the axle shaft 63, its upper end carrying the ratchet pawl 103 to the right or in the clockwise direction, as seen in Figure 2. The parts are so proportioned that the complete movement of the carriage to the right causes a 90° movement of the ratchet 101 and of the attached gear 99. This gear 99 may, for example, be a spur gear with 72 teeth and the meshing gear 95 may have 36 teeth. Consequently, a 90° rotation of gear 99 will cause gear 95 to rotate 180°. The gear 97 interposed between gears 95 and 96 causes the latter gear to also rotate 180°.

The action of the valve pistons 86 is shown in Figures 6, 7, 8 and 9. With the parts at rest, the cylindrical valve plugs 82 are so located that the valve pistons 86 are in a horizontal position. They are also at the right ends of the transverse bores 88 in the valve plug 82. The space in bore 88, to the left of the valve piston 86, will be filled with pie mix, if the section is considered as during the operation of the apparatus. The plug 82 will be rotated in the counter-clockwise direction by its associated gear 95 or 96 as the filling mechanism is drawn to the right by the pitman 32. While in actual operation the piston 86 may begin to slide downwardly before the bore 88 becomes vertical, as shown in Figure 7, nevertheless for the purposes of disclosure, it is described as shown in that figure. It will be understood that actually as soon as a portion of the lower port opening 77, shown in Figure 4, is uncovered, there will be a tendency for the mix to run out through said opening and for the piston 86 to start a downward movement. It will be noted that these pistons 86 are not positively driven, but follow due to their own weight and the weight of the pie mix above them in the hopper 25 which rests upon them through the openings 76. The piston 86 then moves downwardly through an intermediate position, as shown in Figure 8, to a bottom position, as shown in Figure 9. During the entire downward sliding movement of the pistons 86, pie mix is being discharged from the lower end of the cylindrical opening 88 and being admitted through the upper end of that bore above the piston 86. It will be apparent that the movement from the position shown in Figure 6 to that shown in Figure 9 involves a 90° rotation. After the complete discharge has taken place, as shown in Figure 9, the rotation of the valves 82 continues for another 90°, as previously stated. Since gear 99 rotates gears 95 and 96 through a 180° angle, this continued rotation restores the parts to the position shown in Figure 6.

It will be apparent that there might be non-uniformity of the downward movement of the pistons 86 under the influence of varying loads above them if they were permitted to fall freely. To minimize such differences and to insure uniform pie filling, the brake members 115 are provided. It will be apparent that the piston cross rods 92 move with the pistons and consequently at the end of each stroke are always located, as shown in Figure 2, even though the gears 95 and 96 are rotated through only 180° by each stroke. As the gears are rotated in the counterclockwise direction, as seen in Figure 2, it will be apparent that rollers 113 and 114 carried between links 111 and 112 move upwardly and to the left until the rollers 113 and 114 engage the recesses 118 in the corresponding brake members. These rollers 113 bear against the brake and tension the brake springs 122. The surface 118 is so formed that, in combination with the resistance of the springs 122, the downward movement of the rollers 113 and consequently of the piston crossrods 92 and pistons 86 is retarded. This causes the pie mix to be discharged uniformly and smoothly and not suddenly dumped from the passages 88 through the discharge passages 77 in the apparatus. This brake resistance minimizes lack of uniformity of the deposit of the material due to different loadings of mix in the hopper 25 or to different consistencies of mix.

It will be apparent that while the particular construction shown includes two separate cylindrical valve plugs 82, each of which has two cross bores 88 and two pistons 86, the invention may be specifically constructed with other numbers and arrangements of plugs and pistons. The drive mechanism and the hopper are the same regardless of the plug arrangement. Therefore a user may be equipped for various sizes of pies by merely having different feed mechanisms which can be substituted for use with the drive mechanism and hopper in accordance with the pies to be filled.

While I have shown a preferred form of construction, this is to be understood as illustrative only as the apparatus is capable of variation to meet differing requirements and conditions and I contemplate such modifications as come within the spirit and scope of the appended claims.

I claim:

1. In a filling machine, a valve body having a vertical opening extending therethrough, a horizontally extending cylindrical valve plug carried by said body in alignment with said opening, means for rotating said valve plug, a bore through said valve plug adapted to be aligned with the vertical opening in the valve body in certain rotary positions of the plug, a piston movable in said bore, a piston rod extending axially of the valve plug and through the piston, the plug having an axial passage permitting movement of the piston rod transversely of the plug axis and brake means located adjacent the valve plug and operatively connected with the piston rod during its downward gravity movement upon rotation of the valve plug.

2. In a filling machine, a valve body having a vertical opening extending therethrough, a horizontally extending cylindrical valve plug carried by said body in alignment with said opening, means for rotating said valve plug, a bore through said valve plug adapted to be aligned with the vertical opening in the valve body in certain rotary positions of the plug, a piston movable in said bore, a piston rod extending axially of the valve plug and through the piston, the plug having an axial passage permitting movement of the piston rod transversely of the plug axis and brake means having cam surfaces located adjacent the ends of the valve plug and operatively connected with opposite end portions of the piston rod during its downward gravity movement with the associated piston upon rotation of the valve plug to retard the downward movement of the piston.

UNITED STATES PATENTS

References Cited in the file of this patent

| Number | Name | Date |
|---|---|---|
| 540,257 | Jones | June 4, 1895 |
| 854,075 | Burpee | May 21, 1907 |
| 1,223,293 | Rose | Apr. 17, 1917 |
| 1,451,512 | Kellogg | Apr. 10, 1923 |
| 1,676,377 | Bergmann | July 10, 1928 |
| 1,811,957 | Morton | June 30, 1931 |
| 1,861,734 | Bergmann | June 7, 1932 |
| 1,867,998 | Benson | July 19, 1932 |
| 2,067,968 | Kohler | Jan. 19, 1937 |
| 2,482,146 | Baker | Sept. 20, 1949 |
| 2,530,755 | Bingham | Nov. 21, 1950 |